US012596266B2

(12) United States Patent
Schultz et al.

(10) Patent No.: US 12,596,266 B2
(45) Date of Patent: Apr. 7, 2026

(54) SYSTEMS AND METHODS FOR ALIGNMENT OF OPTICAL COMPONENTS

(71) Applicant: Meta Platforms Technologies, LLC, Menlo Park, CA (US)

(72) Inventors: James Schultz, Redmond, WA (US); Zhiqiang Liu, Redmond, WA (US); Randall Scott Toy, Sammamish, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 138 days.

(21) Appl. No.: 18/174,320

(22) Filed: Feb. 24, 2023

(65) Prior Publication Data

US 2024/0012449 A1 Jan. 11, 2024

Related U.S. Application Data

(60) Provisional application No. 63/348,572, filed on Jun. 3, 2022.

(51) Int. Cl.
*G02B 27/62* (2006.01)
*B29C 65/00* (2006.01)
*G06F 1/16* (2006.01)

(52) U.S. Cl.
CPC .............. *G02B 27/62* (2013.01); *B29C 66/98* (2013.01); *G06F 1/163* (2013.01)

(58) Field of Classification Search
CPC ............ G02B 2027/0178; G02B 27/62; G02B 27/017; G02B 2027/0198; G02B 7/003; G02B 7/004; G02B 7/005; G02C 9/00; B32B 2041/04; B32B 17/10954; B29C 65/7817; B29C 66/98; G06F 1/163
USPC .................................................... 156/64, 293
See application file for complete search history.

(56) References Cited

U.S. PATENT DOCUMENTS

2015/0326756 A1* 11/2015 Knutsson ............... H04N 23/57
348/148
2020/0132959 A1* 4/2020 Brooker ................. G02B 7/004

FOREIGN PATENT DOCUMENTS

WO WO-2022167126 A1 * 8/2022 ........... G02B 27/017

* cited by examiner

*Primary Examiner* — John L Goff, II
(74) *Attorney, Agent, or Firm* — Greenberg Traurig, LLP

(57) ABSTRACT

The disclosed methods of assembling a head-mounted display may include supporting a head-mounted display frame, moving the head-mounted display frame to align a frame coordinate system with a fixed optical coordinate system, holding a projector assembly, and moving the projector assembly to align a projected image with the fixed optical coordinate system. The aligned projector assembly may be secured to the aligned head-mounted display frame. Various other methods and systems are also disclosed.

18 Claims, 13 Drawing Sheets

500

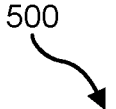
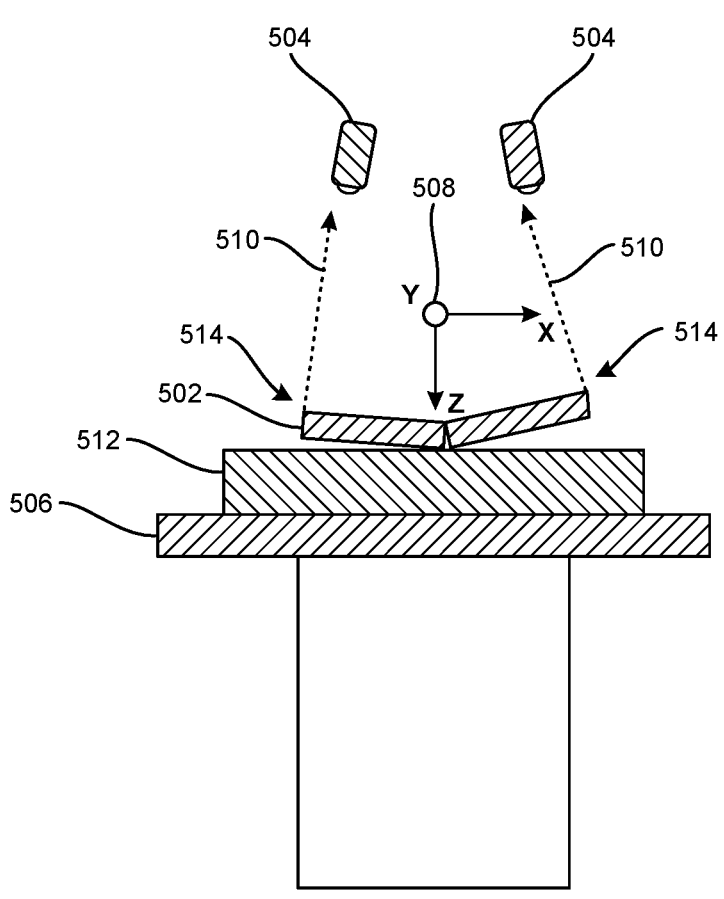
*FIG. 5*

500
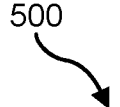
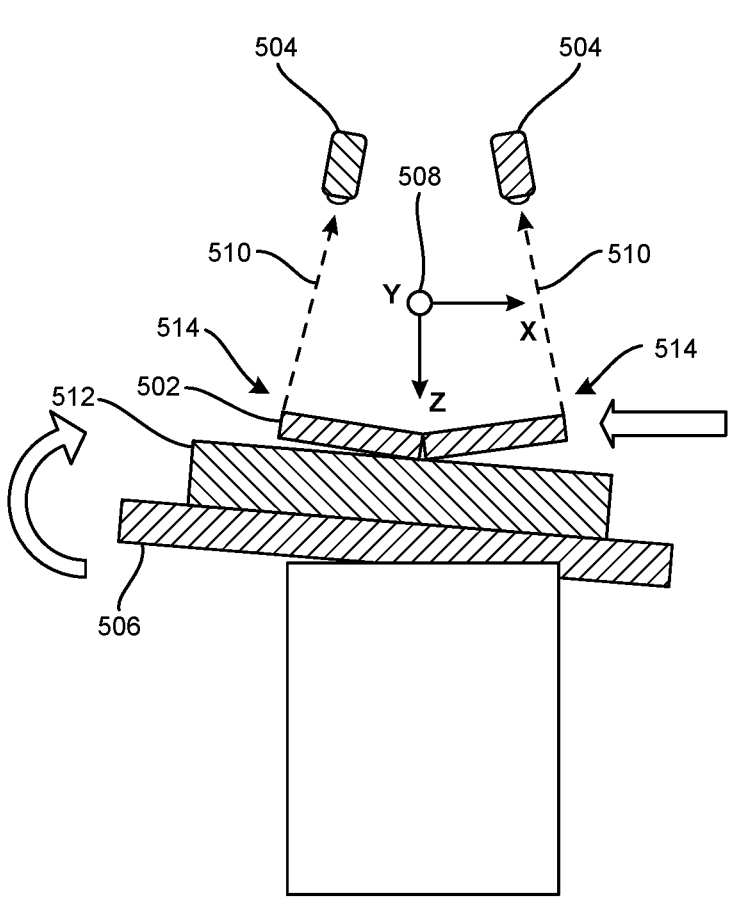
*FIG. 6*

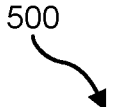
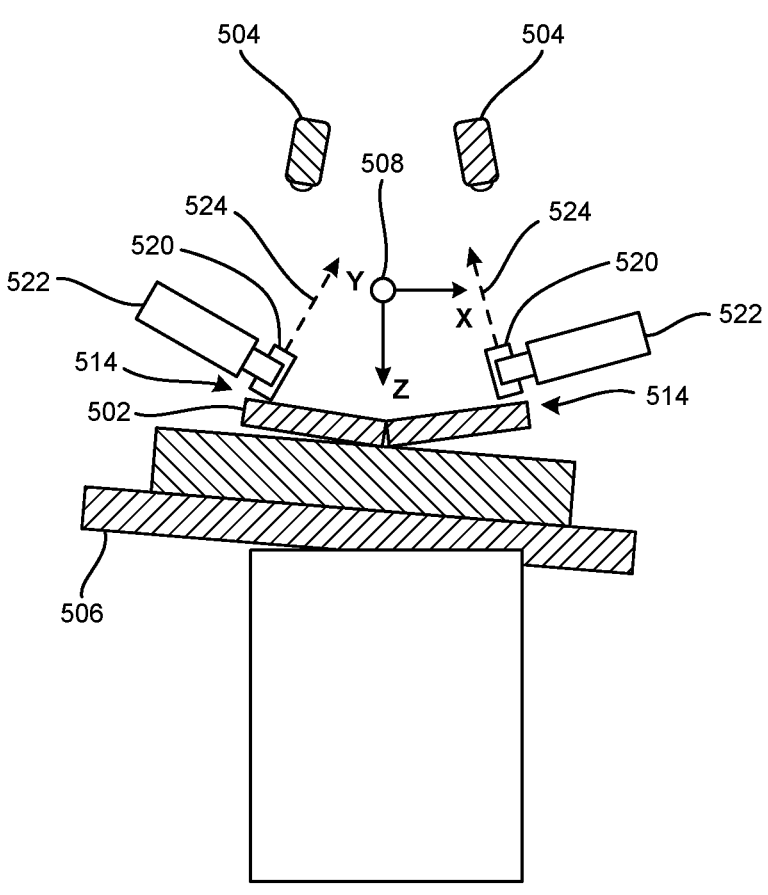
*FIG. 7*

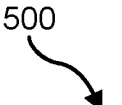
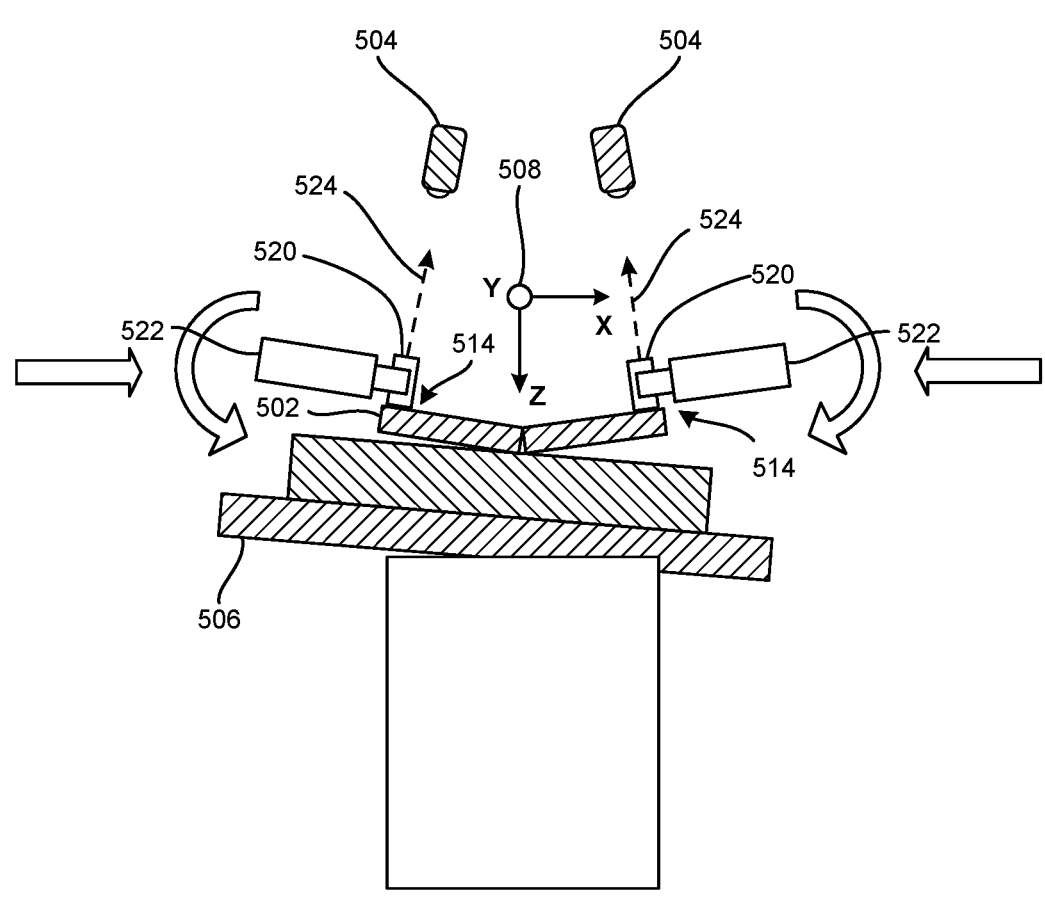
*FIG. 8*

X-Z Translation and ΘY Angular Error

Projection Component Placement Error

X-Z Translation and ΘY Angular Correction

Projection Component Placement Correction

1000

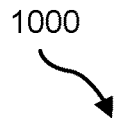

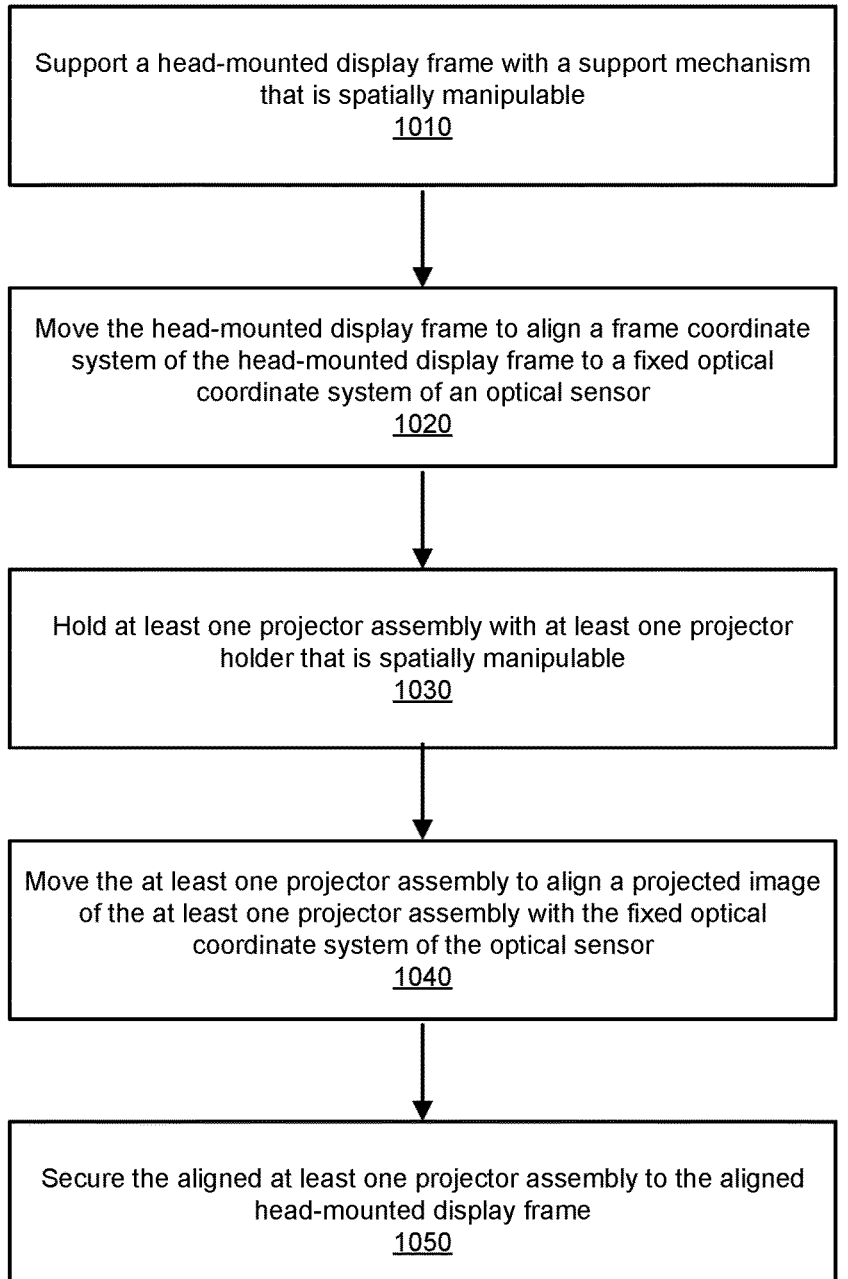

Support a head-mounted display frame with a support mechanism
that is spatially manipulable
1010

Move the head-mounted display frame to align a frame coordinate
system of the head-mounted display frame to a fixed optical
coordinate system of an optical sensor
1020

Hold at least one projector assembly with at least one projector
holder that is spatially manipulable
1030

Move the at least one projector assembly to align a projected image
of the at least one projector assembly with the fixed optical
coordinate system of the optical sensor
1040

Secure the aligned at least one projector assembly to the aligned
head-mounted display frame
1050

*FIG. 10*

1100
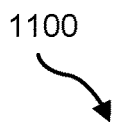
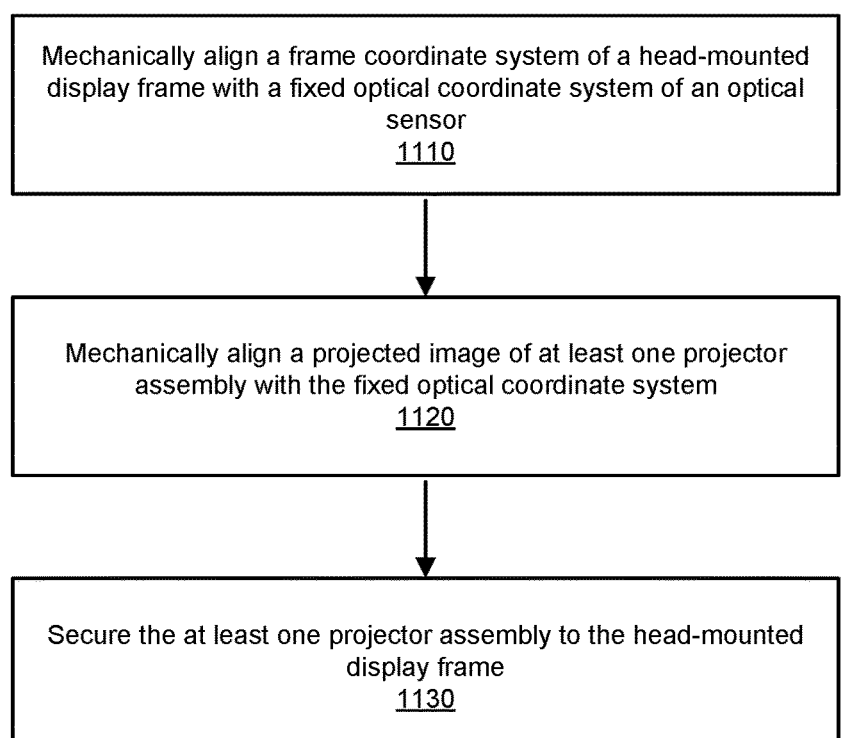
Mechanically align a frame coordinate system of a head-mounted display frame with a fixed optical coordinate system of an optical sensor
1110
Mechanically align a projected image of at least one projector assembly with the fixed optical coordinate system
1120
Secure the at least one projector assembly to the head-mounted display frame
1130
FIG. 11

SYSTEMS AND METHODS FOR ALIGNMENT OF OPTICAL COMPONENTS

CROSS REFERENCE TO RELATED APPLICATION

This application claims the benefit of U.S. Provisional Patent Application Ser. No. 63/348,572, titled "SYSTEMS AND METHODS FOR ALIGNMENT OF OPTICAL COMPONENTS," filed on 3 Jun. 2022, the entire disclosure of which is incorporated herein by this reference.

BRIEF DESCRIPTION OF THE DRAWINGS

The accompanying drawings illustrate a number of example embodiments and are a part of the specification. Together with the following description, these drawings demonstrate and explain various principles of the present disclosure.

FIG. 5 is a side view of a system for aligning optical components, with a frame in an initial orientation relative to a fixed optical coordinate system of optical alignment cameras, according to at least one embodiment of the present disclosure.

FIG. 6 is a side view of the system of FIG. 5, with the frame rotated into an aligned orientation relative to the fixed optical coordinate system of the optical alignment cameras, according to at least one embodiment of the present disclosure.

FIG. 7 is a side view of the system of FIG. 6, with projector assemblies in an initial orientation relative to the fixed optical coordinate system of the optical alignment cameras, according to at least one embodiment of the present disclosure.

FIG. 8 is a side view of the system of FIG. 7, with the projector assemblies rotated and/or translated into an aligned orientation relative to the fixed optical coordinate system of the optical alignment cameras, according to at least one embodiment of the present disclosure.

FIG. 10 is a flow chart illustrating a method for assembling optical components, according to at least one embodiment of the present disclosure.

FIG. 11 is a flow chart illustrating a method for assembling optical components, according to at least one additional embodiment of the present disclosure.

Figure 1:
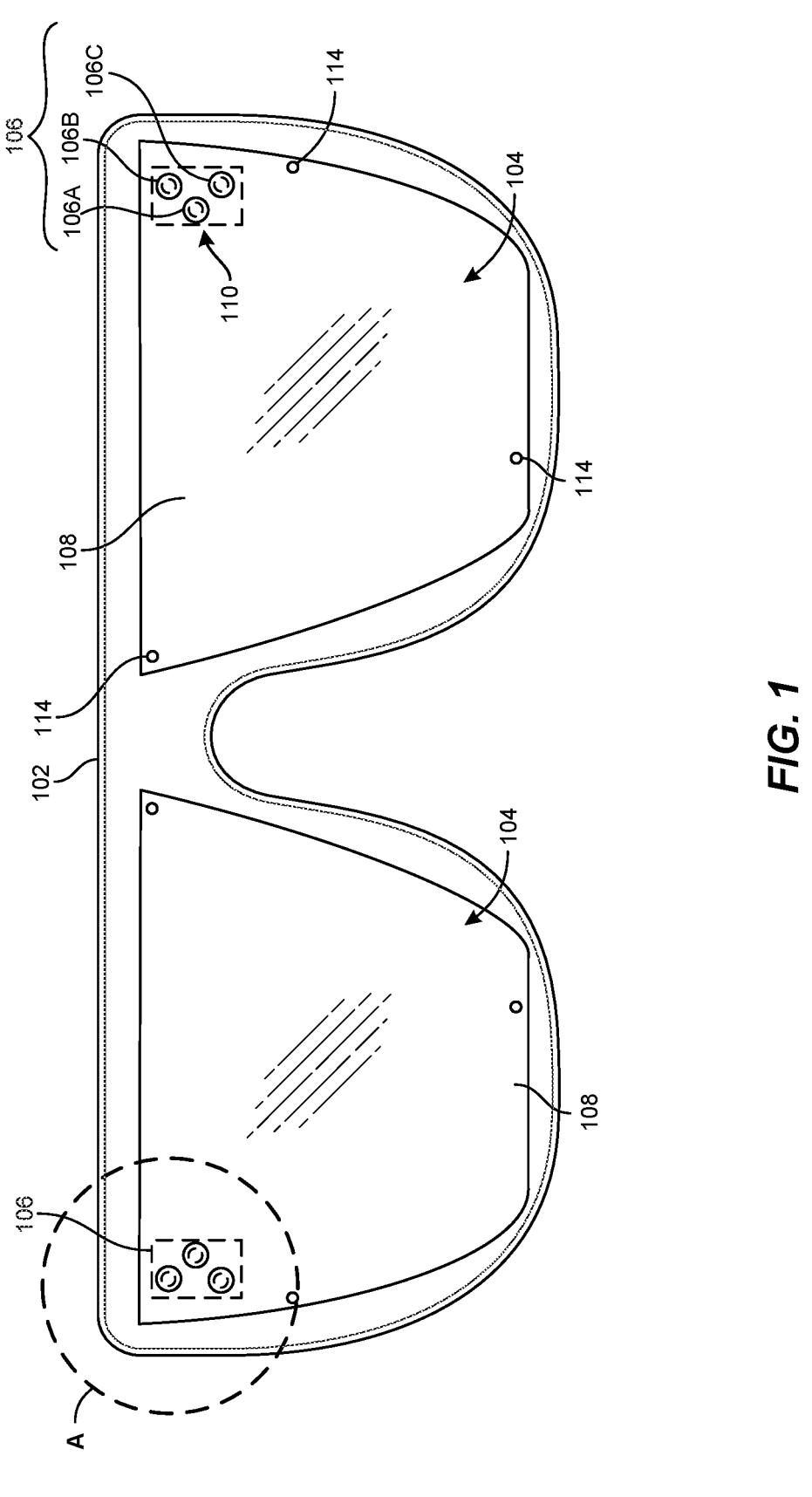
FIG. 1 is a plan view of a head-mounted display, according to at least one embodiment of the present disclosure.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXAMPLE EMBODIMENTS

Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Head-mounted displays (HMDs) including one or more near-eye displays are often used to present visual content to a user for use in artificial-reality applications. One type of near-eye display includes a waveguide that directs light from a projector to a location in front of the user's eyes. Because of the visual sensitivity of human eyes, slight deviations in optical quality can be very apparent to the user. Proper alignment of projectors and waveguides with each other, with a supporting frame, relative to the user, and relative to the overall sensory system can be important to inhibit such deviations and to improve the user's experience viewing visual content presented by near-eye displays.

The present disclosure is generally directed to systems and methods for aligning optical components (e.g., of near-eye displays), such as for aligning a waveguide with corresponding projectors, one or more projectors with a frame, a waveguide with a frame, and/or a projector and waveguide assembly with a frame. For example, embodiments of the present disclosure may include moving a head-mounted display frame to align a frame coordinate system of the head-mounted display frame to a fixed optical coordinate system of an optical sensor to within a first predetermined threshold. At least one projector assembly may also be moved to align a projected image of the at least one projector assembly with the fixed optical coordinate system of the optical sensor. The aligned at least one projector assembly may then be secured to the aligned head-mounted display frame. Such method may improve and facilitate alignment of optical components with each other and/or with a supporting frame. Optical quality and user experience of resulting head-mounted displays may also be improved.

Features from any of the embodiments described herein may be used in combination with one another in accordance with the general principles described herein. These and other embodiments, features, and advantages will be more fully understood upon reading the following detailed description in conjunction with the accompanying drawings and claims.

Figure 2:
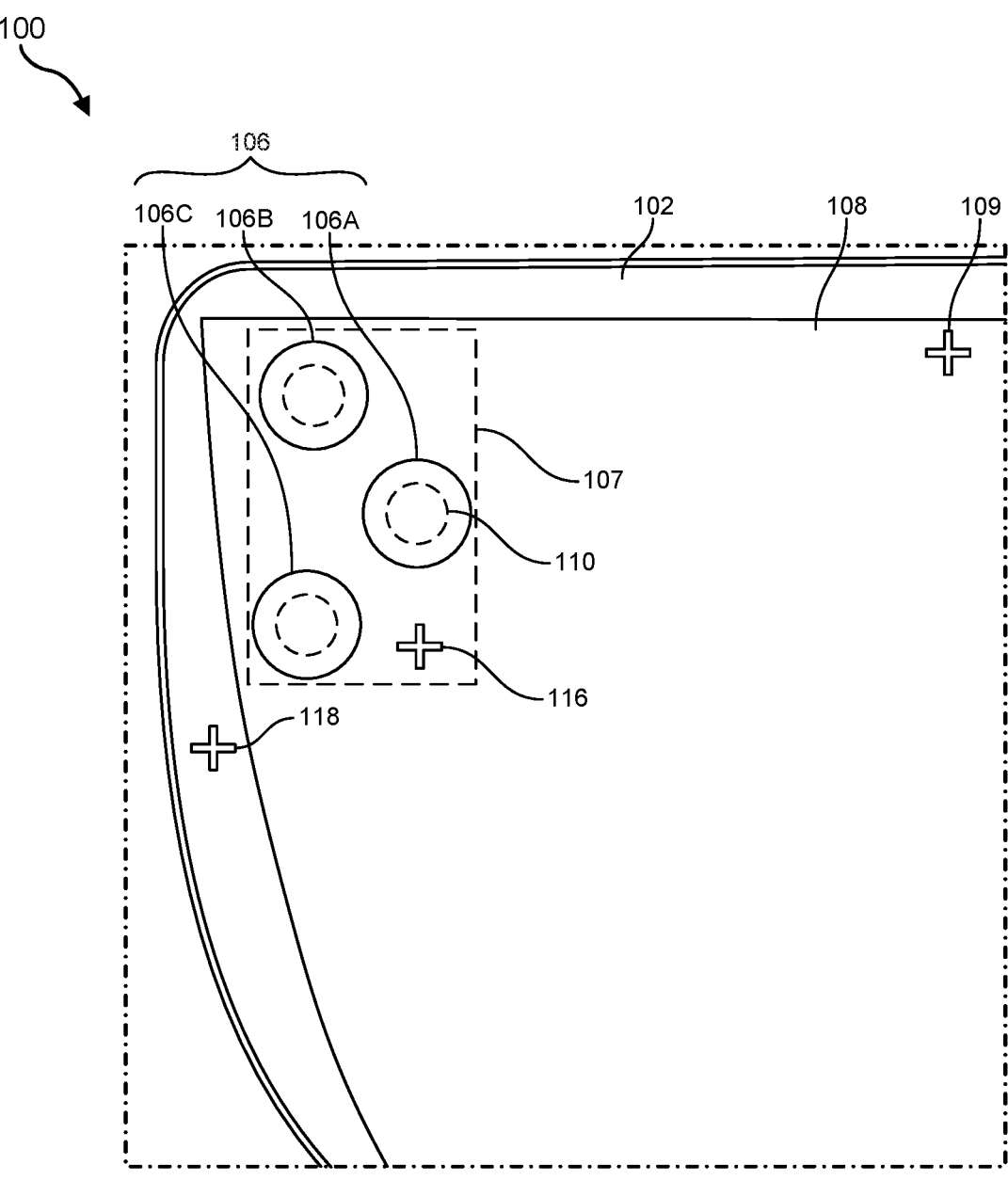
FIG. 2 is a detailed view of a light projector mounted to a frame of the head-mounted display, taken at dashed circle A of FIG. 1, according to at least one embodiment of the present disclosure.
Figure 9A:
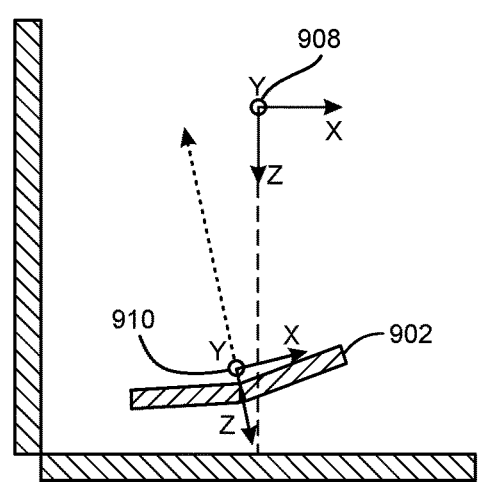
FIG. 9A is a graphical representation of a frame in an initial, misaligned orientation relative to a fixed optical coordinate system, according to at least one embodiment of the present disclosure.
Figure 9B:
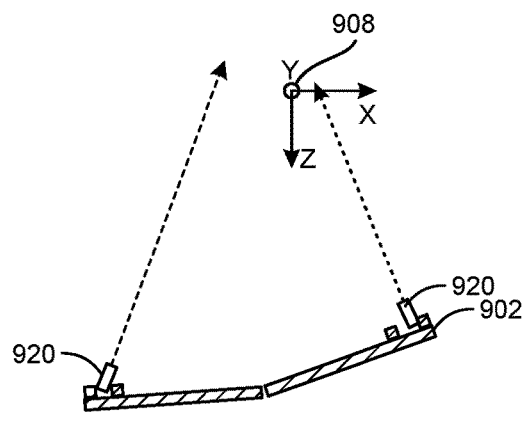
FIG. 9B is a graphical representation of projectors in an initial, misaligned orientation relative to the fixed optical coordinate system, according to at least one embodiment of the present disclosure.

With reference to FIGS. 1 and 2, the following will describe example head-mounted displays and components thereof, according to embodiments of the present disclosure. The optical alignment of a projected pattern as viewed by a camera will then be described with reference to FIG. 3. Next, an embodiment of a head-mounted display and cameras for alignment will be described with reference to FIG. 4. Various stages of alignment of optical components with a fixture will then be described with reference to FIGS. 5-8. With reference to FIGS. 9A and 9B, two different potential optical alignment errors will be described, while correction of these errors will be described in connection with FIGS. 9C and 9D. Next, various methods for assembling a head-mounted display according to the present disclosure will be described with reference to FIGS. 10 and 11. Finally, example augmented-reality glasses and virtual-reality headsets that may be used in connection with embodiments of this disclosure will be descried with reference to FIGS. 12 and 13.

FIG. 1 is a plan view of a head-mounted display 100, according to at least one embodiment of the present disclosure. The head-mounted display 100 may include a frame 102 and a display assembly 104 coupled to the frame 102. The display assembly 104 for each eye may include a light projector 106 (shown in dashed lines in FIG. 1) and a waveguide 108 configured to direct images from the light projector 106 to a user's eye. In some examples, the light projector 106 may include a plurality of (e.g., three) subprojectors 106A, 106B, and 106C that are configured to project light of different wavelengths (e.g., colors, such as red, green, blue, infrared, etc.). The waveguide 108 may include at least one input grating 110 positioned adjacent to and optically aligned with the light projector 106. The input grating 110 may be configured to enable light from the subprojectors 106A, 106B, and 106C to enter into the waveguide 108 to be directed to the center of the waveguide 108 for presentation to the user's eye. For example, as shown in FIG. 1 in dashed lines, the input grating 110 may include three optical apertures respectively aligned with the three subprojectors 106A, 106B, and 106C of the light projector 106.

In some examples, the head-mounted display 100 may be implemented in the form of augmented-reality glasses. Accordingly, the waveguide 108 may be at least partially transparent to visible light to allow the user to view a real-world environment through the waveguide 108. Images presented to the user's eye by the light projectors 106 may overlay the user's view of the real-world environment.

The waveguide 108 may be physically secured to the frame 102 in a manner that aligns the waveguide 108 to the light projectors 106, to a user's view, and/or to the frame 102. For example, the light projectors 106 may first be aligned with and secured to the frame 102. Then, the input gratings 110 of the waveguides 108 may be optically aligned with the light projectors 106.

In some embodiments, the waveguide 108 may be secured to the frame 102 with an adhesive material, one or more fasteners, an adhesive, a clip, etc., such as after completion of the optical alignment of the waveguides 108 with the respective light projectors 106. For example, an adhesive material may be positioned between the waveguide 108 and the frame 102 at multiple (e.g., two, three, or more than three) distinct locations 114 to maintain the relative position between the waveguide 108 and the light projector 106. In additional embodiments, the waveguide 108 may be secured to the frame 102 in a continuous manner, such as along one or more peripheral edges of the waveguide 108 by an adhesive, a clip, a frame cover element, etc.

FIG. 2 is a detailed view of the light projector 106 mounted to the frame 102 of the head-mounted display 100, taken at dashed circle A of FIG. 1, according to at least one embodiment of the present disclosure. As shown in FIG. 2, the light projector 106 may be mounted on the frame 102 of the head-mounted display 100, such as in an upper corner of the frame 102. The first subprojector 106A may include a blue light source, the second subprojector 106B may include a red light source, and the third subprojector 106C may include a green light source. Other colors and arrangements of the subprojectors 106A, 106B, and 106C may also be possible.

To assemble the head-mounted display 100, the three subprojectors 106A, 106B, and 106C may be initially assembled with each other (e.g., three subprojectors mounted to a common substrate 107, three collimating lenses aligned on the three subprojectors, etc.) to form the light projector 106 as a unit. The light projector 106 (e.g., the substrate 107 of the light projector 106) may include one or more projector fiducial marks 116, which may be used in optically aligning (e.g., positioning, orienting, securing) the light projector 106 with the frame 102. In some examples, the frame 102 may likewise include one or more frame fiducial marks 118 to assist in the optical alignment of the light projector 106 with the frame 102.

Optical alignment of the light projector 106 relative to the frame 102 may involve viewing the light projector 106 and/or frame 102 during placement of the light projector 106 in or on the frame 102 with one or more cameras, which may be used to identify the location and orientation of the projector fiducial mark(s) 116 relative to the location and orientation of the frame fiducial mark(s) 118. The projector fiducial mark(s) 116 and the frame fiducial mark(s) 118 are each shown in FIG. 2 in the shape of a plus sign. In additional examples, other shapes, physical features (e.g., of the light projector 106 and/or of the frame 102), reflective surfaces, or other optical identifiers may be used to optically align the light projector 106 relative to the frame 102. In some embodiments, the light projector 106 may be aligned relative to the frame 102 using an image projected by the light projector 106, such as is explained below with reference to FIG. 3.

After the light projector 106 is aligned with and secured to the frame 102, the waveguide 108 may be aligned with the light projector 106 and secured to the frame 102. For example, the waveguide 108 may include a waveguide fiducial mark 109, which may be used in optically aligning (e.g., positioning, orienting, securing) the waveguide 108 to the frame 102 and/or to the light projector 106. In addition, the input gratings 110 of the waveguide 108 may be optically aligned with the subprojectors 106A, 106B, and 106C. In some examples, the input gratings 110 may be smaller than respective apertures of the subprojectors 106A, 106B, and 106C as shown in FIG. 2. In additional examples, the input gratings 110 may be substantially the same size as or larger than the respective apertures of the subprojectors 106A, 106B, and 106C.

Figure 3:
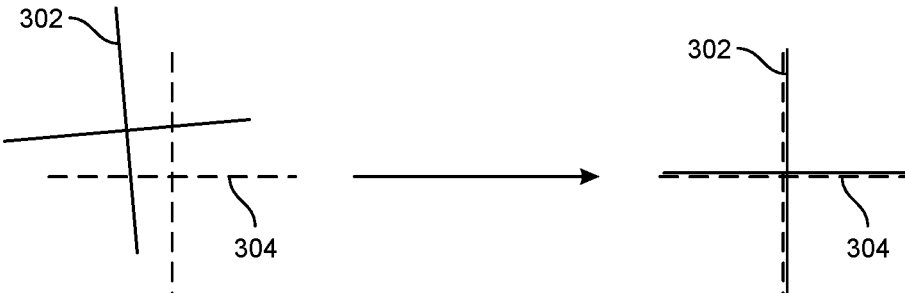
FIG. 3 illustrates optical alignment of a projected pattern as viewed by a camera, according to at least one embodiment of the present disclosure.

FIG. 3 illustrates optical alignment of a projected pattern 302 as viewed by a camera, according to at least one embodiment of the present disclosure. The projected pattern 302 may be aligned with a camera target 304. The projected pattern 302 may be produced by a light projector, such as the light projector 106 described above. One or more cameras may view the projected pattern 302 and compare the location and orientation of the projected pattern 302 to the camera target 304. The light projector and/or a frame to which the light projector is to be mounted may be moved (e.g., laterally shifted, angled, rotated, etc.) to align the projected pattern 302 with the camera target 304 to an acceptable resolve (e.g., within an acceptable tolerance) before the light projector is fixed in position relative to the frame. In some examples, the alignment of the projected pattern 302 with the camera target 304 may be performed while exposing the light projector 106 and the frame 102 to conditions that may be expected during use of the resulting assembly. For example, a heat load may be applied to the light projector 106 during alignment to mimic thermal loading that may occur during use.

Figure 4:
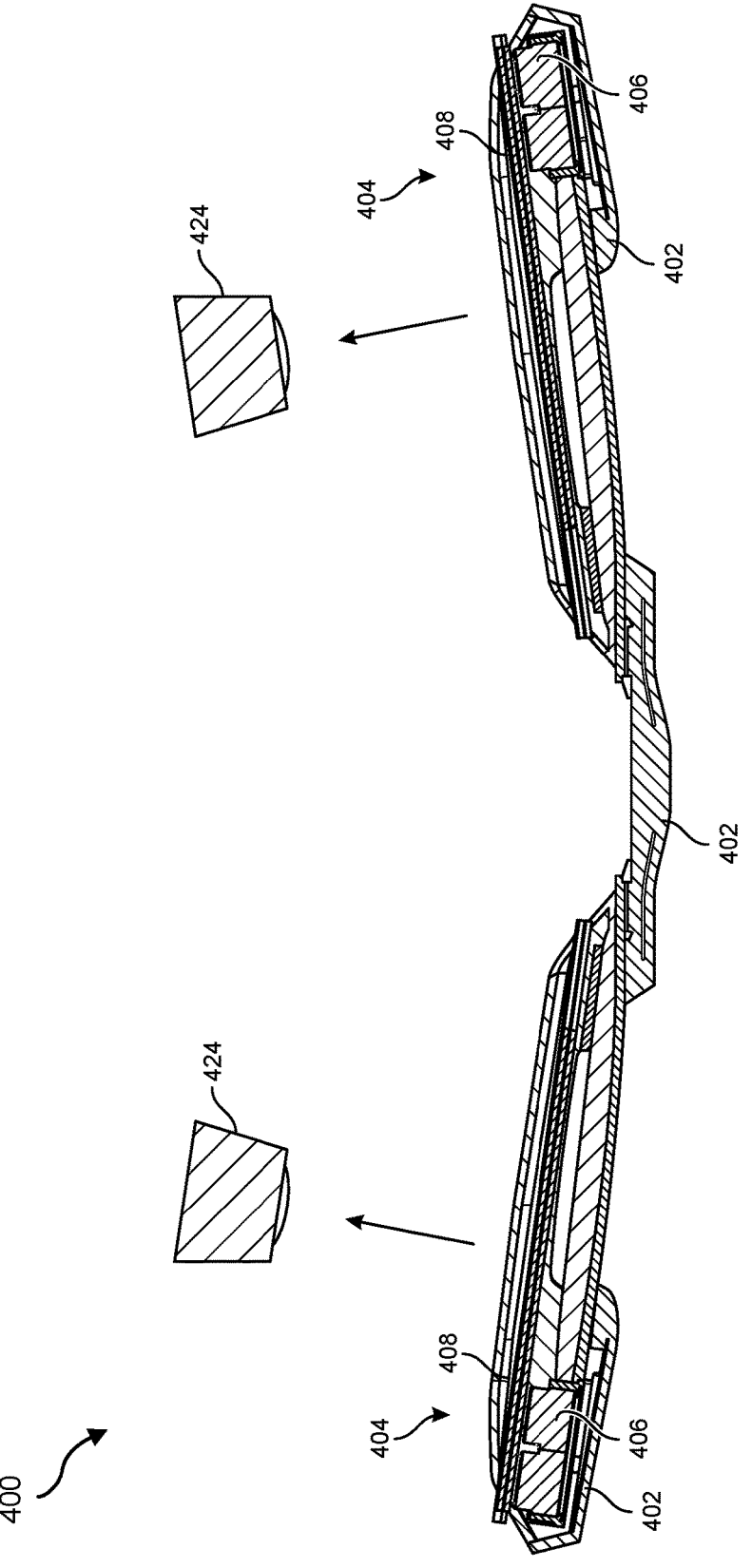
FIG. 4 is a cross-sectional view of a head-mounted display with alignment cameras, according to at least one embodiment of the present disclosure.

FIG. 4 is a cross-sectional view of a head-mounted display 400 with alignment cameras 424, according to at least one embodiment of the present disclosure. In at least some respects, the head-mounted display 400 may be similar to the head-mounted display 100 described above. For example, the head-mounted display 400 may include a frame 402, and a display assembly 404 including a light projector 406 and a waveguide 408 mounted to the frame 402.

The alignment cameras 424 may be used during assembly of the head-mounted display 400 to optically align the light projector 406 with the frame 402 and/or to optically align the waveguide 408 (e.g., input gratings of the waveguide 408) with the light projector 406. For example, the alignment cameras 424 may be used to detect the location and/or orientation of a fiducial mark (e.g., the projector fiducial marks 116, the frame fiducial marks 118, the waveguide fiducial marks 109, etc.), a physical component or feature, a reflective material, etc. In additional examples, the alignment cameras 424 may be used to detect a location and/or orientation of a projected pattern (e.g., the projected pattern 302) relative to a target (e.g., the camera target 304). This detected information may be used to adjust a position and/or orientation of the light projector 406 relative to the frame 402 and/or of the waveguide 408 relative to the light projector 406 and/or frame 402.

FIG. 5 is a side view of a system 500 for aligning optical components, with a frame 502 (e.g., a head-mounted display frame, a projector frame, etc.) in an initial orientation relative to a fixed optical coordinate system 508 of optical alignment cameras 504, according to at least one embodiment of the present disclosure.

Frames for supporting optical components may be subject to manufacturing variabilities and tolerances that result in each unique frame having slightly different and/or unpredictable mounting structures (e.g., mounting structures with different relative locations, angles, thicknesses, etc.) for the optical components. This variability in frame mounting structures may cause optical components mounted thereto to be misaligned unless the optical components are properly aligned (e.g., with each other, with a frame coordinate system, etc.) and fixed in place during assembly. The misalignment may cause perceptible optical quality reductions, potentially diminishing a user's experience. Thus, the system 500 may be configured for aligning optical components to each other and/or to the frame 502 for improvement of optical quality and user experience.

The system 500 may include a support mechanism 506 that is spatially manipulable relative to the fixed optical coordinate system 508 associated with the optical alignment cameras 504. The support mechanism 506 may be configured to move (e.g., translate and/or rotate) the frame 502 to align a frame coordinate system 510 with the fixed optical coordinate system 508 to within a first predetermined threshold (e.g., within 5 arcminutes of rotation, within 2 arcminutes of rotation, within 1 mm of translation, within 500 μm of translation, etc.).

By way of example and not limitation, the support mechanism 506 may include movement control mechanisms such as a hexapod, a linear stage, and/or a goniometer for moving and measuring movement of the support mechanism 506 and the frame 502 mounted thereto relative to the fixed optical coordinate system 508. The support mechanism 506 may be movable in at least six degrees of freedom, including translation in an X-direction, translation in a Y-direction, translation in a Z-direction, rotation about an X-axis, rotation about a Y-axis, and rotation about a Z-axis. In addition, the support mechanism 506 may be movable with a high accuracy and precision, such as to length accuracies within 2 mm, 1 mm, 0.5 mm, 10 μm, 1 μm, 500 nm, 100 nm, or 10 nm and/or to angular accuracies within 1 degree, 0.5 degree, 15 arcminutes, 10 arcminutes, 5 arcminutes, 2 arcminutes, or 1 arcminute.

The support mechanism 506 may include a fixture 512 shaped and configured for receiving and holding the frame 502. For example, the fixture 512 may have a shape that is complementary to a shape of the frame 502. The fixture 512 may include one or more retaining mechanisms, such as one or more clips, magnets, grooves, etc., for retaining the frame 502 in place. When the frame 502 is initially supported in the system 500, the frame 502 may lack at least one optical component (e.g., projector, waveguide, display screen, lens, etc.) that is to be mounted on or in the frame 502.

The frame 502 may include one or more features that can be used as fiducials for determining an initial orientation and position of the frame 502 and corresponding frame coordinate system 510 relative to the fixed optical coordinate system 508. For example, the frame 502 may include one or more fiducial marks 116 as discussed above with reference to FIG. 2, a physical feature (e.g., a frame part, a mounting structure, a notch, etc.) that can be optically identified, and/or a colored mark (e.g., paint, ink, distinguishable material, etc.) that can be optically identified. In additional embodiments, the initial position and orientation of the frame 502 and its frame coordinate system 510 may be determined with light (e.g., radar, laser, structured light) and/or sound (e.g., ultrasound, sonar) directed toward and reflected off the frame 502 to an appropriate sensor.

As illustrated in FIG. 5, in some cases the frame coordinate system 510 will initially be misaligned with the fixed optical coordinate system 508. In other words, projector mounting locations 514 on the frame 502 may not initially be sufficiently aligned in location and/or angle relative to the optical alignment cameras 504.

FIG. 6 is a side view of the system 500 of FIG. 5, with the frame 502 rotated into an aligned orientation relative to the fixed optical coordinate system 508 of the optical alignment cameras 504, according to at least one embodiment of the present disclosure.

After the initial position and orientation of the frame 502 is determined as discussed above with reference to FIG. 5, the support mechanism 506 may translate and/or rotate the frame 502 to compensate for any initial misalignment, bringing the frame coordinate system 510 into sufficient alignment (e.g., within a predetermined threshold distance and/or angle) with the fixed optical coordinate system 508. For example, the frame 502 may be translated to result in the frame coordinate system 510 being within about 2 mm (e.g., within 1 mm, 0.5 mm, 10 μm, 1 μm, 500 nm, 100 nm, 10 nm, etc.) of the fixed optical coordinate system 508. Additionally or alternatively, the frame 502 may be rotated to result in the frame coordinate system 510 being within about 1 degree (e.g., within 0.5 degree, 15 arcminutes, 10 arcminutes, 5 arcminutes, 2 arcminutes, 1 arcminute, etc.) of the fixed optical coordinate system 508.

FIG. 7 is a side view of the system 500 of FIG. 6, with projector assemblies 520 in an initial orientation relative to the fixed optical coordinate system 510 of the optical alignment cameras 504, according to at least one embodiment of the present disclosure.

The projector assemblies 520 may be held and positioned over (e.g., abutting against, above, proximate to, etc.) the frame 502 with one or more projector holders 522. After the frame 502 has been aligned with the fixed optical coordinate system 510, the frame 502 may serve as an optical bench for aligning the projector assemblies 520 with the fixed optical coordinate system 510.

With the projector assemblies 520 in the initial position, an image 524 may be projected by the projector assemblies 520, and the optical alignment cameras 504 may be used to sense a position and orientation of the image 524, such as relative to a target image as described above with reference to FIG. 3. The image 524 may have a shape that enables the optical alignment cameras 504 to sense both the position and orientation of the image 524.

After the initial position and orientation of the image 524 is sensed, the system 500 may determine an appropriate corresponding movement of the projector assemblies 520 that may be performed to align the image 524 with the fixed optical coordinate system 508 (e.g., a target image) of the optical alignment cameras 504. For example, the movement to be performed may include translation and/or rotation of the projector assemblies 520 by the projector holder(s) 522 to align the projector assemblies 520 to within a second predetermined threshold (e.g., within 5 arcminutes, within 2 arcminutes, within 1 mm of translation, within 500 μm of translation, etc.).

By way of example and not limitation, the projector holders 522 may include movement control mechanisms such as a hexapod, a linear stage, and/or a goniometer for moving and measuring movement of the projector holders 522 and the projector assemblies 520 relative to the fixed optical coordinate system 508. The projector holders 522 may each be movable in at least six degrees of freedom, including translation in an X-direction, translation in a Y-direction, translation in a Z-direction, rotation about an X-axis, rotation about a Y-axis, and rotation about a Z-axis. In addition, the projector holders 522 may be movable with a high accuracy and precision, such as to length accuracies within 2 mm, 1 mm, 0.5 mm, 10 μm, 1 μm, 500 nm, 100 nm, or 10 nm and/or to angular accuracies within 1 degree, 0.5 degree, 15 arcminutes, 10 arcminutes, 5 arcminutes, 2 arcminutes, or 1 arcminute.

FIG. 8 is a side view of the system 500 of FIG. 7, with the projector assemblies 520 rotated and/or translated into an aligned position and orientation relative to the fixed optical coordinate system 508 of the optical alignment cameras 504, according to at least one embodiment of the present disclosure.

As illustrated in FIG. 8, each of the projector assemblies 520 may be rotated and/or translated to align with one or more of the optical alignment cameras 504, such as to align the image 524 projected by the projector assembly 520 with a camera target of a corresponding one of the optical alignment cameras 504. For example, the projector holders 522 may rotate and/or translate the respective projector assemblies 520 to compensate for any misalignment thereof with the fixed optical coordinate system 508.

The projector assemblies 520 may then be fixed to the frame 502 (e.g., at the projector mounting locations 514) while the projector assemblies 520 are held in an aligned position and orientation. By way of example, an adhesive (e.g., a liquid-dispensed adhesive) may be disposed between the projector assemblies 520 and the frame 502 and the adhesive may be cured to fix the projector assemblies 520 in the proper position and orientation relative to the frame 502. Additionally or alternatively, one or more screws, welds, clips, etc., may be used to fix the projector assemblies 520 in place on the frame 502.

By first aligning the frame 502 with the optical alignment cameras 504, the projector mounting locations 514 may be in a predictable location and orientation, which may facilitate mounting the projector assemblies 520 thereto. In addition, this procedure may reduce errors and variability in mounting the projector assemblies 520.

Although the system 500 is shown in FIGS. 5-8 as including two optical alignment cameras 504 for positioning two projector assemblies 520, the present disclosure is not so limited. In additional embodiments, the system 500 may include only one optical alignment camera 504, such as for aligning a single projector assembly 520 to the frame 502 and/or for mounting two or more projector assemblies 520 to the frame 502. In additional embodiments, the projector assembly 520 may be replaced by any optical component or assembly, such as a waveguide, a projector and waveguide assembly, a display screen, an optical lens, a mirror or other reflective surface, etc. In other examples, a similar process as described with reference to FIGS. 5-8 may be performed to mount one optical component to another, such as a waveguide to a projector or a projector to a waveguide (e.g., to align an optical input grating of a waveguide with a projector). Thus, embodiments of the present disclosure are not limited to the particular examples that are described and shown.

FIG. 9A is a graphical representation of a frame 902 in an initial, misaligned orientation relative to a fixed optical coordinate system 908. FIG. 9B is a graphical representation of projectors 920 in an initial, misaligned orientation relative to the fixed optical coordinate system 908.

As illustrated in FIG. 9A, the frame 902 may include a frame coordinate system 910 that may correspond to a position and orientation of the frame 902. In FIG. 9A, the frame coordinate system 910 is misaligned with the fixed optical coordinate system 908 beyond a predetermined threshold. By way of example and not limitation, the frame coordinate system 910 may be translated away from an aligned position in an X-Z plane and may be rotated away from an aligned orientation about a Y-axis. This misalignment may be due to manufacturing errors or tolerances, a manner by which the frame 902 is held relative to the fixed optical coordinate system 908, etc.

As illustrated in FIG. 9B, the initial misalignment of the frame 902 relative to the fixed optical coordinate system 908 may result in difficulties in aligning the projectors 920 with the fixed optical coordinate system 908. For example, a projector holder used to mount the projectors 920 to the frame 902 may have sufficient range of movement to place the projectors 920 in an appropriate position and orientation to align the projectors 920 with the fixed optical coordinate system 908. In additional examples, structures on the frame 902 may physically interfere with the projectors 920 as placement and orientation of the projectors 920 is attempted. Thus, for a variety of potential reasons, it may be difficult or impossible to mount the projectors 920 on the frame 902 while aligning one or more of the projectors 920 with the fixed optical system 908 in a way that results in high optical quality.

Figure 9C:
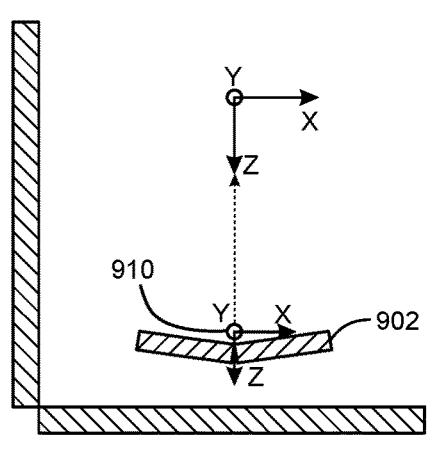
FIG. 9C is a graphical representation of a frame in a corrected, aligned orientation relative to the fixed optical coordinate system, according to at least one embodiment of the present disclosure.
Figure 9D:
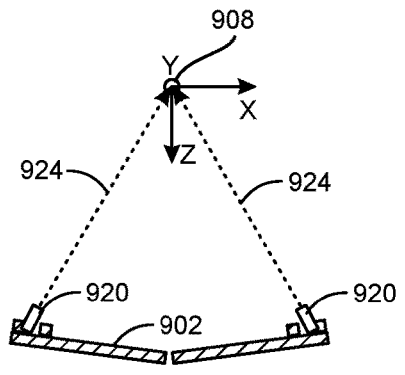
FIG. 9D is a graphical representation of the projectors in a corrected, aligned orientation relative to the fixed optical coordinate system, according to at least one embodiment of the present disclosure.

FIG. 9C is a graphical representation of the frame 902 in a corrected, aligned orientation relative to the fixed optical coordinate system 908. FIG. 9D is a graphical representation of the projectors 920 in a corrected, aligned orientation relative to the fixed optical coordinate system 908.

As illustrated in FIG. 9C, the frame 902 may be moved (e.g., translated and/or rotated) to compensate for any initial misalignment with the fixed optical coordinate system 908. Thus, the frame coordinate system 910 may be aligned with the fixed optical coordinate system 908 to within a first predetermined threshold.

Referring to FIG. 9D, after the frame 902 is sufficiently aligned with the fixed optical coordinate system 908, the frame 902 may be used as an optical bench for aligning the projectors 920 with the fixed optical coordinate system 908. In other words, the frame 902 may be in a position and orientation that facilitates placement of the projectors 920 in a proper position and orientation relative to the frame 902 and relative to the fixed optical coordinate system 908. The projectors 920 may be aligned with the fixed optical coordinate system 908 to within a second predetermined threshold, such as by aligning an image 924 from the projectors 920 with a camera target of an optical sensor, as explained above. After the alignment is complete, the projectors 920 may be fixed to the frame 902. In some examples, this alignment process including first aligning the frame 902 and then aligning the projectors 920 with the fixed optical coordinate system, may improve an optical quality of a resulting optical system (e.g., a head-mounted display system, etc.).

FIG. 10 is a flow chart illustrating a method 1000 for assembling optical components, according to at least one embodiment of the present disclosure. At operation 1010, a head-mounted display frame may be supported with a support mechanism that is spatially manipulable. For example, the support mechanism may be spatially manipulable in six degrees of freedom (e.g., translation in an X-direction translation in a Y-direction, translation in a Z-direction, rotation about an X-axis, rotation about a Y-axis, and rotation about a Z-axis). In addition, the position and/or orientation of the support mechanism may be movable with a high accuracy and precision, such as to length accuracies within 2 mm, 1 mm, 0.5 mm, 10 μm, 1 μm, 500 nm, 100 nm, or 10 nm and/or to angular accuracies within 1 degree, 0.5 degree, 15 arcminutes, 10 arcminutes, 5 arcminutes, 2 arcminutes, or 1 arcminute.

In some examples, an initial position of the head-mounted display frame relative to the fixed optical coordinate system may be determined. For example, one or more fiducials on the head-mounted display frame may be optically sensed to determine the initial position (e.g., location and/or orientation) of the head-mounted display frame.

At operation 1020, the head-mounted display frame may be moved to align a frame coordinate system of the head-mounted display frame to a fixed optical coordinate system of an optical sensor. For example, the support mechanism may translate and/or rotate the head-mounted display frame to compensate for and counteract any misalignment with the fixed optical coordinate system. The alignment may be achieved within a first predetermined threshold (e.g., less than 5 arcminutes of rotation, less than 0.5 mm of translation, etc.).

At operation 1030, at least one projector assembly may be held with at least one projector holder that is spatially manipulable. For example, the projector holder may be spatially manipulable in at least three degrees of freedom, such as in six degrees of freedom (e.g., translation in an X-direction translation in a Y-direction, translation in a Z-direction, rotation about an X-axis, rotation about a Y-axis, and rotation about a Z-axis). In addition, the position and/or orientation of the projector holder may be movable with a high accuracy and precision, such as to length accuracies within 2 mm, 1 mm, 0.5 mm, 10 μm, 1 μm, 500 nm, 100 nm, or 10 nm and/or to angular accuracies within 1 degree, 0.5 degree, 15 arcminutes, 10 arcminutes, 5 arcminutes, 2 arcminutes, or 1 arcminute.

In some examples, an initial position of the at least one projector assembly relative to the fixed optical coordinate system may be determined. For example, the initial position of the at least one projector assembly may be determined by optically sensing an image projected by the at least one projector assembly with the optical sensor.

At operation 1040, the at least one projector assembly may be moved to align a projected image of the at least one projector assembly with the fixed optical coordinate system of the optical sensor. For example, the projector holder may translate and/or rotate the projector assembly to compensate for and counteract any misalignment with the fixed optical coordinate system. The alignment may be achieved within a second predetermined threshold (e.g., less than 5 arcminutes of rotation, less than 2 arcminutes of rotation, less than 0.5 mm of translation, less than 100 μm of translation, etc.).

At operation 1050, the at least one projector assembly may be secured to the aligned head-mounted display frame, such as when the at least one projector assembly is also aligned with the fixed optical coordinate system. For example, an adhesive may be disposed between the projector assembly and the head-mounted display frame. The adhesive may then be cured while holding the projector assembly in place on or over the head-mounted display frame.

FIG. 11 is a flow chart illustrating a method 1100 for assembling optical components, according to at least one additional embodiment of the present disclosure. At operation 1110, a frame coordinate system of a head-mounted display frame may be mechanically aligned with a fixed optical coordinate system of an optical sensor. For example, the head-mounted display frame may be mechanically moved (e.g., translated and/or rotated) from an initial misaligned position into an aligned position to within a first predetermined threshold. The movement may be performed by a support mechanism holding the head-mounted display frame. The support mechanism may spatially manipulate (e.g., in six degrees of freedom) the head-mounted display frame relative to the optical sensor.

At operation 1120, a projected image of at least one projector assembly may be mechanically aligned with the fixed optical coordinate system. For example, the at least one projector may be mechanically moved (e.g., translated and/or rotated) from an initial misaligned position into an aligned position to within a second predetermined threshold. The movement may be performed by a projector holder holding the at least one projector assembly. The projector holder may spatially manipulate (e.g., in six degrees of freedom) the at least one projector assembly relative to the optical sensor.

At operation 1130, the at least one projector assembly may be secured to the head-mounted display frame after mechanically aligning the frame coordinate system and the projected image with the fixed optical coordinate system. For example, an adhesive may be used to secure the at least one projector assembly to the head-mounted display frame.

Accordingly, the present disclosure includes head-mounted displays and methods that facilitate improved alignment of optical components with each other and with a frame of the head-mounted displays. The improved alignment of the optical components may inhibit (e.g., reduce or eliminate) optical deviations that would otherwise detract from a user's visual experience while using the head-mounted displays. In addition, assembly of optical components may be facilitated by employing methods disclosed herein.

Embodiments of the present disclosure may include or be implemented in conjunction with various types of artificial-reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs). Other artificial-reality systems may include an NED that also provides visibility into the real world (such as, e.g., augmented-reality system 1200 in FIG. 12) or that visually immerses a user in an artificial reality (such as, e.g., virtual-reality system 1300 in FIG. 13). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 12:
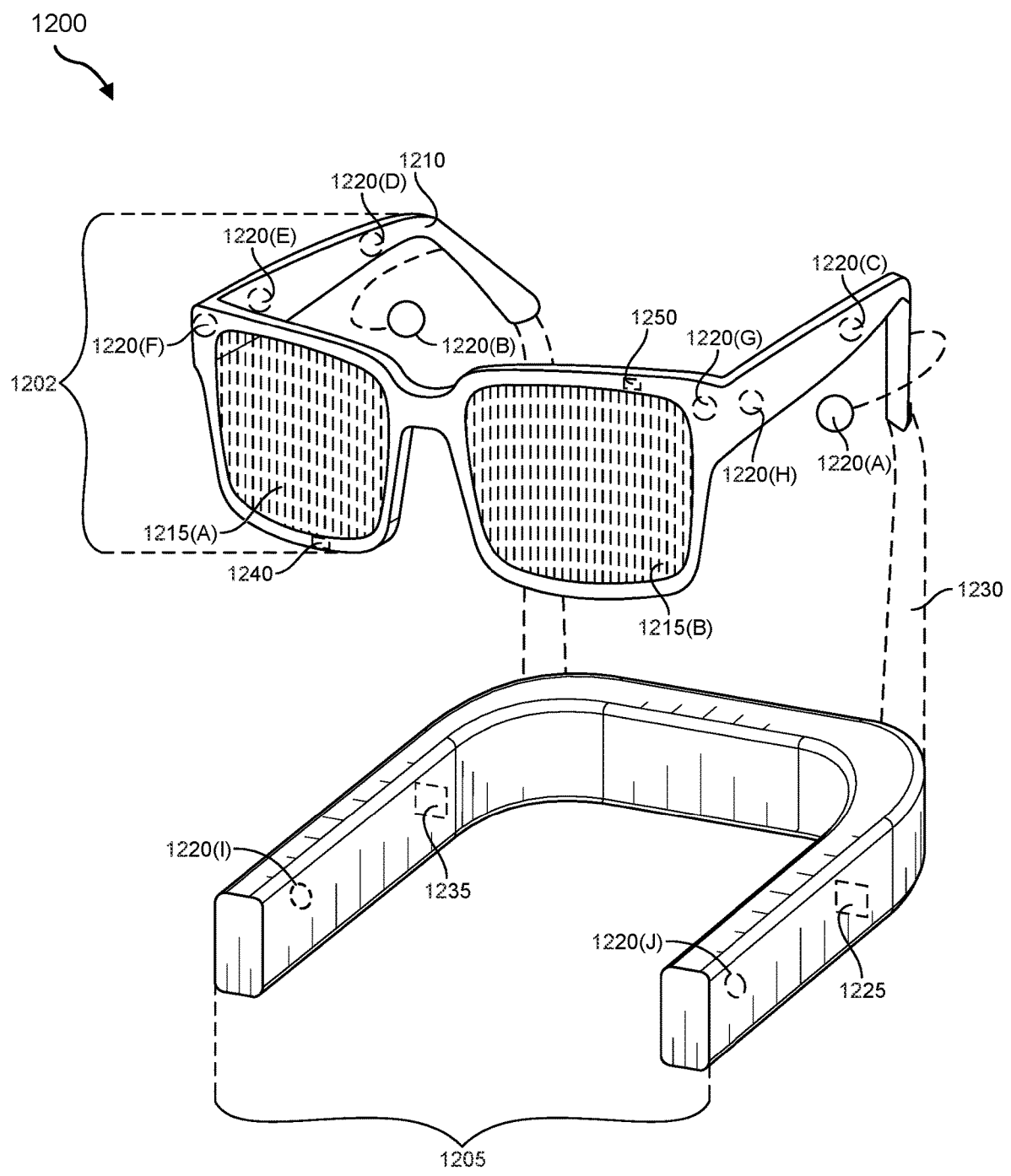
FIG. 12 is an illustration of example augmented-reality glasses that may be used in connection with embodiments of this disclosure.
Figure 13:
FIG. 13 is an illustration of an example virtual-reality headset that may be used in connection with embodiments of this disclosure.

Turning to FIG. 12, the augmented-reality system 1200 may include an eyewear device 1202 with a frame 1210 configured to hold a left display device 1215(A) and a right display device 1215(B) in front of a user's eyes. The display devices 1215(A) and 1215(B) may act together or independently to present an image or series of images to a user. While the augmented-reality system 1200 includes two displays, embodiments of this disclosure may be implemented in augmented-reality systems with a single NED or more than two NEDs.

In some embodiments, the augmented-reality system 1200 may include one or more sensors, such as sensor 1240. The sensor 1240 may generate measurement signals in response to motion of the augmented-reality system 1200 and may be located on substantially any portion of the frame 1210. The sensor 1240 may represent one or more of a variety of different sensing mechanisms, such as a position sensor, an inertial measurement unit (IMU), a depth camera assembly, a structured light emitter and/or detector, or any combination thereof. In some embodiments, the augmented-reality system 1200 may or may not include the sensor 1240 or may include more than one sensor. In embodiments in which the sensor 1240 includes an IMU, the IMU may generate calibration data based on measurement signals from the sensor 1240. Examples of the sensor 1240 may include, without limitation, accelerometers, gyroscopes, magnetometers, other suitable types of sensors that detect motion, sensors used for error correction of the IMU, or some combination thereof.

In some examples, the augmented-reality system 1200 may also include a microphone array with a plurality of acoustic transducers 1220(A)-1220(J), referred to collectively as acoustic transducers 1220. The acoustic transducers 1220 may represent transducers that detect air pressure variations induced by sound waves. Each acoustic transducer 1220 may be configured to detect sound and convert the detected sound into an electronic format (e.g., an analog or digital format). The microphone array in FIG. 12 may include, for example, ten acoustic transducers: 1220(A) and 1220(B), which may be designed to be placed inside a corresponding ear of the user, acoustic transducers 1220(C), 1220(D), 1220(E), 1220(F), 1220(G), and 1220(H), which may be positioned at various locations on the frame 1210, and/or acoustic transducers 1220(I) and 1220(J), which may be positioned on a corresponding neckband 1205.

In some embodiments, one or more of the acoustic transducers 1220(A)-(J) may be used as output transducers (e.g., speakers). For example, the acoustic transducers 1220(A) and/or 1220(B) may be earbuds or any other suitable type of headphone or speaker.

The configuration of the acoustic transducers 1220 of the microphone array may vary. While the augmented-reality system 1200 is shown in FIG. 12 as having ten acoustic transducers 1220, the number of acoustic transducers 1220 may be greater or less than ten. In some embodiments, using higher numbers of acoustic transducers 1220 may increase the amount of audio information collected and/or the sensitivity and accuracy of the audio information. In contrast, using a lower number of acoustic transducers 1220 may decrease the computing power required by an associated controller 1250 to process the collected audio information. In addition, the position of each acoustic transducer 1220 of the microphone array may vary. For example, the position of an acoustic transducer 1220 may include a defined position on the user, a defined coordinate on the frame 1210, an orientation associated with each acoustic transducer 1220, or some combination thereof.

The acoustic transducers 1220(A) and 1220(B) may be positioned on different parts of the user's ear, such as behind the pinna, behind the tragus, and/or within the auricle or fossa. Or, there may be additional acoustic transducers 1220 on or surrounding the ear in addition to the acoustic transducers 1220 inside the ear canal. Having an acoustic transducer 1220 positioned next to an ear canal of a user may enable the microphone array to collect information on how sounds arrive at the ear canal. By positioning at least two of the acoustic transducers 1220 on either side of a user's head (e.g., as binaural microphones), the augmented-reality device 1200 may simulate binaural hearing and capture a 3D stereo sound field around about a user's head. In some embodiments, the acoustic transducers 1220(A) and 1220 (B) may be connected to the augmented-reality system 1200 via a wired connection 1230, and in other embodiments the acoustic transducers 1220(A) and 1220(B) may be connected to the augmented-reality system 1200 via a wireless connection (e.g., a BLUETOOTH connection). In still other embodiments, the acoustic transducers 1220(A) and 1220 (B) may not be used at all in conjunction with the augmented-reality system 1200.

The acoustic transducers 1220 on the frame 1210 may be positioned in a variety of different ways, including along the length of the temples, across the bridge, above or below the display devices 1215(A) and 1215(B), or some combination thereof. The acoustic transducers 1220 may also be oriented such that the microphone array is able to detect sounds in a wide range of directions surrounding the user wearing the augmented-reality system 1200. In some embodiments, an optimization process may be performed during manufacturing of the augmented-reality system 1200 to determine relative positioning of each acoustic transducer 1220 in the microphone array.

In some examples, the augmented-reality system 1200 may include or be connected to an external device (e.g., a paired device), such as the neckband 1205. The neckband 1205 generally represents any type or form of paired device. Thus, the following discussion of the neckband 1205 may also apply to various other paired devices, such as charging cases, smart watches, smart phones, wrist bands, other wearable devices, hand-held controllers, tablet computers, laptop computers, other external compute devices, etc.

As shown, the neckband 1205 may be coupled to the eyewear device 1202 via one or more connectors. The connectors may be wired or wireless and may include electrical and/or non-electrical (e.g., structural) components. In some cases, the eyewear device 1202 and neckband 1205 may operate independently without any wired or wireless connection between them. While FIG. 12 illustrates the components of the eyewear device 1202 and neckband 1205 in example locations on the eyewear device 1202 and neckband 1205, the components may be located elsewhere and/or distributed differently on the eyewear device 1202 and/or neckband 1205. In some embodiments, the components of the eyewear device 1202 and neckband 1205 may be located on one or more additional peripheral devices paired with the eyewear device 1202, neckband 1205, or some combination thereof.

Pairing external devices, such as the neckband 1205, with augmented-reality eyewear devices may enable the eyewear devices to achieve the form factor of a pair of glasses while still providing sufficient battery and computation power for expanded capabilities. Some or all of the battery power, computational resources, and/or additional features of the augmented-reality system 1200 may be provided by a paired device or shared between a paired device and an eyewear device, thus reducing the weight, heat profile, and form factor of the eyewear device overall while still retaining desired functionality. For example, the neckband 1205 may allow components that would otherwise be included on an eyewear device to be included in the neckband 1205 since users may tolerate a heavier weight load on their shoulders than they would tolerate on their heads. The neckband 1205 may also have a larger surface area over which to diffuse and disperse heat to the ambient environment. Thus, the neckband 1205 may allow for greater battery and computation capacity than might otherwise have been possible on a stand-alone eyewear device. Since weight carried in the neckband 1205 may be less invasive to a user than weight carried in the eyewear device 1202, a user may tolerate wearing a lighter eyewear device and carrying or wearing the paired device for greater lengths of time than a user would tolerate wearing a heavy standalone eyewear device, thereby enabling users to more fully incorporate artificial-reality environments into their day-to-day activities.

The neckband 1205 may be communicatively coupled with the eyewear device 1202 and/or to other devices. These other devices may provide certain functions (e.g., tracking, localizing, depth mapping, processing, storage, etc.) to augmented-reality system 1200. In the embodiment of FIG. 12, neckband 1205 may include two acoustic transducers (e.g., 1220(I) and 1220(J)) that are part of the microphone array (or potentially form their own microphone subarray). Neckband 1205 may also include a controller 1225 and a power source 1235.

Acoustic transducers 1220(I) and 1220(J) of neckband 1205 may be configured to detect sound and convert the detected sound into an electronic format (analog or digital). In the embodiment of FIG. 12, acoustic transducers 1220(I) and 1220(J) may be positioned on neckband 1205, thereby increasing the distance between the neckband acoustic transducers 1220(I) and 1220(J) and other acoustic transducers 1220 positioned on eyewear device 1202. In some cases, increasing the distance between acoustic transducers 1220 of the microphone array may improve the accuracy of beamforming performed via the microphone array. For example, if a sound is detected by acoustic transducers 1220(C) and 1220(D) and the distance between acoustic transducers 1220(C) and 1220(D) is greater than, e.g., the distance between acoustic transducers 1220(D) and 1220(E), the determined source location of the detected sound may be more accurate than if the sound had been detected by acoustic transducers 1220(D) and 1220(E).

Controller 1225 of neckband 1205 may process information generated by the sensors on neckband 1205 and/or augmented-reality system 1200. For example, controller 1225 may process information from the microphone array that describes sounds detected by the microphone array. For each detected sound, controller 1225 may perform a direction-of-arrival (DOA) estimation to estimate a direction from which the detected sound arrived at the microphone array. As the microphone array detects sounds, controller 1225 may populate an audio data set with the information. In embodiments in which augmented-reality system 1200 includes an inertial measurement unit, controller 1225 may compute all inertial and spatial calculations from the IMU located on eyewear device 1202. A connector may convey information between augmented-reality system 1200 and neckband 1205 and between augmented-reality system 1200 and controller 1225. The information may be in the form of optical data, electrical data, wireless data, or any other transmittable data form. Moving the processing of information generated by augmented-reality system 1200 to neckband 1205 may reduce weight and heat in eyewear device 1202, making it more comfortable to the user.

Power source 1235 in neckband 1205 may provide power to eyewear device 1202 and/or to neckband 1205. Power source 1235 may include, without limitation, lithium ion batteries, lithium-polymer batteries, primary lithium batteries, alkaline batteries, or any other form of power storage. In some cases, power source 1235 may be a wired power source. Including power source 1235 on neckband 1205 instead of on eyewear device 1202 may help better distribute the weight and heat generated by power source 1235.

As noted, some artificial-reality systems may, instead of blending an artificial reality with actual reality, substantially replace one or more of a user's sensory perceptions of the real world with a virtual experience. One example of this type of system is a head-worn display system, such as virtual-reality system 1300 in FIG. 13, that mostly or completely covers a user's field of view. Virtual-reality system 1300 may include a front rigid body 1302 and a band 1304 shaped to fit around a user's head. Virtual-reality system 1300 may also include output audio transducers 1306(A) and 1306(B). Furthermore, while not shown in FIG. 13, front rigid body 1302 may include one or more electronic elements, including one or more electronic displays, one or more inertial measurement units (IMUs), one or more tracking emitters or detectors, and/or any other suitable device or system for creating an artificial-reality experience.

Artificial-reality systems may include a variety of types of visual feedback mechanisms. For example, display devices in augmented-reality system 1200 and/or virtual-reality system 1300 may include one or more liquid crystal displays (LCDs), light emitting diode (LED) displays, microLED displays, organic LED (OLED) displays, digital light project (DLP) micro-displays, liquid crystal on silicon (LCoS) micro-displays, and/or any other suitable type of display screen. These artificial-reality systems may include a single display screen for both eyes or may provide a display screen for each eye, which may allow for additional flexibility for varifocal adjustments or for correcting a user's refractive error. Some of these artificial-reality systems may also include optical subsystems having one or more lenses (e.g., concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some of the artificial-reality systems described herein may include one or more projection systems. For example, display devices in augmented-reality system 1200 and/or virtual-reality system 1300 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial-reality systems may also be configured with any other suitable type or form of image projection system, such as retinal projectors used in virtual retina displays.

The artificial-reality systems described herein may also include various types of computer vision components and subsystems. For example, augmented-reality system 1200 and/or virtual-reality system 1300 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

The artificial-reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the artificial-reality systems described herein may also include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial-reality experience in one or more of these contexts and environments and/or in other contexts and environments.

The following example embodiments are also included in this disclosure:

Example 1: A method of assembling a head-mounted display, which may include: supporting a head-mounted display frame with a support mechanism that is spatially manipulable; moving, with the support mechanism, the head-mounted display frame to align a frame coordinate system of the head-mounted display frame to a fixed optical coordinate system of an optical sensor to within a first predetermined threshold; holding at least one projector assembly with at least one projector holder that is spatially manipulable; moving, with the at least one projector holder, the at least one projector assembly to align a projected image of the at least one projector assembly with the fixed optical coordinate system of the optical sensor to within a second predetermined threshold; and securing the aligned at least one projector assembly to the aligned head-mounted display frame.

Example 2: The method of Example 1, wherein moving the head-mounted display frame includes manipulating the support mechanism in at least three degrees of freedom.

Example 3: The method of Example 2, wherein moving the head-mounted display frame includes manipulating the support mechanism in at least six degrees of freedom.

Example 4: The method of any of Examples 1 through 3, wherein aligning the projected image with the fixed optical coordinate system to within the second predetermined threshold includes aligning the projected image with an optical target of the fixed optical coordinate system to within 5 arcminutes.

Example 5: The method of Example 4, wherein aligning the projected image with the fixed optical coordinate system to within the second predetermined threshold includes aligning the projected image with an optical target of the fixed optical coordinate system to within 2 arcminutes.

Example 6: The method of any of Examples 1 through 5, wherein the support mechanism includes at least one of a hexapod, a linear stage, or a goniometer for moving the support mechanism relative to the fixed optical coordinate system.

Example 7: The method of any of Examples 1 through 6, wherein moving, with the support mechanism, the head-mounted display frame includes at least one of: linearly moving the head-mounted display frame; or rotating the head-mounted display frame.

Example 8: The method of any of Examples 1 through 7, which may also include determining an initial frame position of the head-mounted display frame relative to the fixed optical coordinate system of the optical sensor.

Example 9: The method of Example 8, wherein determining the initial frame position includes optically sensing at least one fiducial on the head-mounted display frame with the optical sensor.

Example 10: The method of any of Examples 1 through 9, which may also include determining an initial projector position of the at least one projector assembly relative to the fixed optical coordinate system of the optical sensor.

Example 11: The method of Example 10, wherein determining the initial projector position includes optically sensing the projected image with the optical sensor.

Example 12: The method of any of Examples 1 through 11, wherein: holding the at least one projector assembly with at least one projector holder includes respectively holding two projector assemblies with the at least one projector holder; moving, with the at least on projector holder, the at least one projector assembly includes moving, with the at least one projector holder, the two projector assemblies; and securing the aligned at least one projector assembly to the aligned head-mounted display frame includes securing the aligned two projector assemblies to the aligned head-mounted display frame.

Example 13: A method of assembling a head-mounted display, which may include: mechanically aligning a frame coordinate system of a head-mounted display frame with a fixed optical coordinate system of an optical sensor to within a first predetermined threshold; mechanically aligning a projected image of at least one projector assembly with the fixed optical coordinate system of the optical sensor to within a second predetermined threshold; and after mechanically aligning the frame coordinate system and the projected image with the fixed optical coordinate system, securing the at least one projector assembly to the head-mounted display frame.

Example 14: The method of Example 13, wherein: mechanically aligning the frame coordinate system with the fixed optical coordinate system includes spatially manipulating, with a support mechanism, the head-mounted display frame relative to the optical sensor; and mechanically aligning the projected image with the fixed optical coordinate system includes spatially manipulating, with a projector holder, the at least one projector assembly relative to the optical sensor.

Example 15: The method of Example 14, wherein: the support mechanism is spatially manipulable in six degrees of freedom; and the projector holder is spatially manipulable in six degrees of freedom.

Example 16: The method of any of Examples 13 through 15, wherein securing the at least one projector assembly to the head-mounted display frame includes: applying an adhesive between the at least one projector assembly and the head-mounted display frame; and curing the adhesive.

Example 17: The method of any of Examples 13 through 16, wherein the at least one projector assembly includes two projector assemblies.

Example 18: A system for assembling a head-mounted display, which may include: at least one optical sensor having a fixed optical coordinate system; a support mechanism that is spatially manipulable, the support mechanism configured for supporting and moving a head-mounted display frame to align a frame coordinate system of the head-mounted display frame with the fixed optical coordinate system; and at least one projector holder that is spatially manipulable, the projector holder configured for holding and moving at least one projector assembly to align a projected image of the at least one projector assembly with the fixed optical coordinate system and for holding the at least one projector assembly in position relative to the head-mounted display frame.

Example 19: The system of Example 18, wherein the head-mounted display frame includes at least a portion of an augmented-reality glasses frame.

Example 20: The system of Example 18 or Example 19, wherein each of the support mechanism and the projector holder includes at least one of: a hexapod, a linear stage, or a goniometer.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A method of assembling a head-mounted display, the method comprising:
supporting a head-mounted display frame with a support mechanism that is spatially manipulable relative to a fixed optical coordinate system of an optical sensor, the support mechanism includes a fixture, wherein:
a surface of the fixture directly interfaces with a corresponding surface of the head-mounted display frame and an opposing surface of the fixture directly interfaces with the support mechanism, and
the fixture has a shape that complements an additional shape of the head-mounted display frame;
moving, with the support mechanism, the head-mounted display frame to align a frame coordinate system of the head-mounted display frame to the fixed optical coordinate system of the optical sensor to within a first predetermined threshold;
holding at least one projector assembly with at least one projector holder that is spatially manipulable relative to the fixed optical coordinate system of the optical sensor;
moving, with the at least one projector holder, the at least one projector assembly to align a projected image of the at least one projector assembly with the fixed optical coordinate system of the optical sensor to within a second predetermined threshold; and
securing the aligned at least one projector assembly to the aligned head-mounted display frame.

2. The method of claim 1, wherein moving the head-mounted display frame comprises manipulating the support mechanism in at least three degrees of freedom.

3. The method of claim 2, wherein moving the head-mounted display frame comprises manipulating the support mechanism in at least six degrees of freedom.

4. The method of claim 1, wherein aligning the projected image with the fixed optical coordinate system to within the second predetermined threshold comprises aligning the projected image with an optical target of the fixed optical coordinate system to within 5 arcminutes.

5. The method of claim 4, wherein aligning the projected image with the fixed optical coordinate system to within the second predetermined threshold comprises aligning the projected image with the optical target of the fixed optical coordinate system to within 2 arcminutes.

6. The method of claim 1, wherein the support mechanism comprises at least one of a hexapod, a linear stage, or a goniometer for moving the support mechanism relative to the fixed optical coordinate system.

7. The method of claim 1, wherein moving, with the support mechanism, the head-mounted display frame comprises at least one of:
linearly moving the head-mounted display frame; or
rotating the head-mounted display frame.

8. The method of claim 1, further comprising determining an initial frame position of the head-mounted display frame relative to the fixed optical coordinate system of the optical sensor.

9. The method of claim 8, wherein determining the initial frame position comprises optically sensing at least one fiducial on the head-mounted display frame with the optical sensor.

10. The method of claim 1, further comprising determining an initial projector position of the at least one projector assembly relative to the fixed optical coordinate system of the optical sensor.

11. The method of claim 10, wherein determining the initial projector position comprises optically sensing the projected image with the optical sensor.

12. The method of claim 1, wherein:
holding the at least one projector assembly with the at least one projector holder comprises respectively holding two projector assemblies with the at least one projector holder;
moving, with the at least one projector holder, the at least one projector assembly comprises moving, with the at least one projector holder, the two projector assemblies; and
securing the aligned at least one projector assembly to the aligned head-mounted display frame comprises securing the aligned two projector assemblies to the aligned head-mounted display frame.

13. A method of assembling a head-mounted display, the method comprising:
mechanically aligning, with a spatially manipulable support mechanism, a frame coordinate system of a head-mounted display frame with a fixed optical coordinate system of an optical sensor to within a first predetermined threshold, the support mechanism includes a fixture, wherein:
a surface of the fixture directly interfaces with a corresponding surface of the head-mounted display frame and an opposing surface of the fixture directly interfaces with the support mechanism, and
the fixture has a shape that complements an additional shape of the head-mounted display frame;
mechanically aligning, with at least one spatially manipulable projector holder, a projected image of at least one projector assembly with the fixed optical coordinate system of the optical sensor to within a second predetermined threshold; and
after mechanically aligning the frame coordinate system and the projected image with the fixed optical coordinate system, securing the at least one projector assembly to the head-mounted display frame.

14. The method of claim 13, wherein:

mechanically aligning the frame coordinate system with the fixed optical coordinate system comprises spatially manipulating, with the support mechanism, the head-mounted display frame relative to the optical sensor; and mechanically aligning the projected image with the fixed optical coordinate system comprises spatially manipulating, with the at least one projector holder, the at least one projector assembly relative to the optical sensor.

15. The method of claim 13, wherein:

the support mechanism is spatially manipulable in six degrees of freedom; and the at least one projector holder is spatially manipulable in six degrees of freedom.

16. The method of claim 13, wherein securing the at least one projector assembly to the head-mounted display frame comprises:

applying an adhesive between the at least one projector assembly and the head-mounted display frame; and curing the adhesive while holding the at least one projector assembly in place relative to the head-mounted display frame.

17. The method of claim 13, wherein the at least one projector assembly comprises two projector assemblies.

18. The method of claim 17, wherein the at least one projector holder comprises two projector holders for respectively holding the two projector assemblies.

* * * * *